(12) United States Patent
Maalouf et al.

(10) Patent No.: US 10,866,651 B1
(45) Date of Patent: Dec. 15, 2020

(54) INTEGRATION OF A PHYSICAL KEYBOARD INTO A TERMINAL SYSTEM WITH A VIRTUAL KEYBOARD

(71) Applicants: Ramzi Khalil Maalouf, Chevy Chase, MD (US); Jinrong Yang, Shanghai (CN)

(72) Inventors: Ramzi Khalil Maalouf, Chevy Chase, MD (US); Jinrong Yang, Shanghai (CN)

( * ) Notice: Subject to any disclaimer, the term of this patent is extended or adjusted under 35 U.S.C. 154(b) by 275 days.

(21) Appl. No.: 15/979,470

(22) Filed: May 15, 2018

Related U.S. Application Data

(60) Provisional application No. 62/505,990, filed on May 15, 2017.

(51) Int. Cl.
*G06F 3/023* (2006.01)
(52) U.S. Cl.
CPC ................... *G06F 3/0233* (2013.01)
(58) Field of Classification Search
CPC .... G06F 1/1662; G06F 1/1669; G06F 3/0202; G06F 3/0219; G06F 3/0227; G06F 3/044; G06F 2203/04809
See application file for complete search history.

(56) References Cited

U.S. PATENT DOCUMENTS

| 2013/0335327 | A1* | 12/2013 | Solomon | G06F 1/1662 |
| | | | | 345/168 |
| 2017/0168593 | A1* | 6/2017 | Kwak | G06F 1/1669 |
| 2018/0210508 | A1* | 7/2018 | Aurongzeb | G06F 1/1669 |

* cited by examiner

*Primary Examiner* — Nelson M Rosario
(74) *Attorney, Agent, or Firm* — Chris D. Thompson

(57) ABSTRACT

A smart terminal system includes a touch panel device and an integrated physical keyboard as an option to the terminal's built-in virtual keyboard. In an embodiment, the physical keyboard is coupled to the touch panel device such that the built-in virtual keyboard is turned off when the physical keyboard is detected. In one embodiment, the physical keyboard is made of a touch sensitized material (silicone rubber or plastic etc.) to enhance the user's natural feel touch experience. The physical keyboard is overlaid onto the screen such that its layout and input coordinates match these of the virtual keyboard. The physical keyboard is transparent to allow viewing of the display screen beneath the physical keyboard in the space previously occupied by the virtual keyboard.

25 Claims, 6 Drawing Sheets

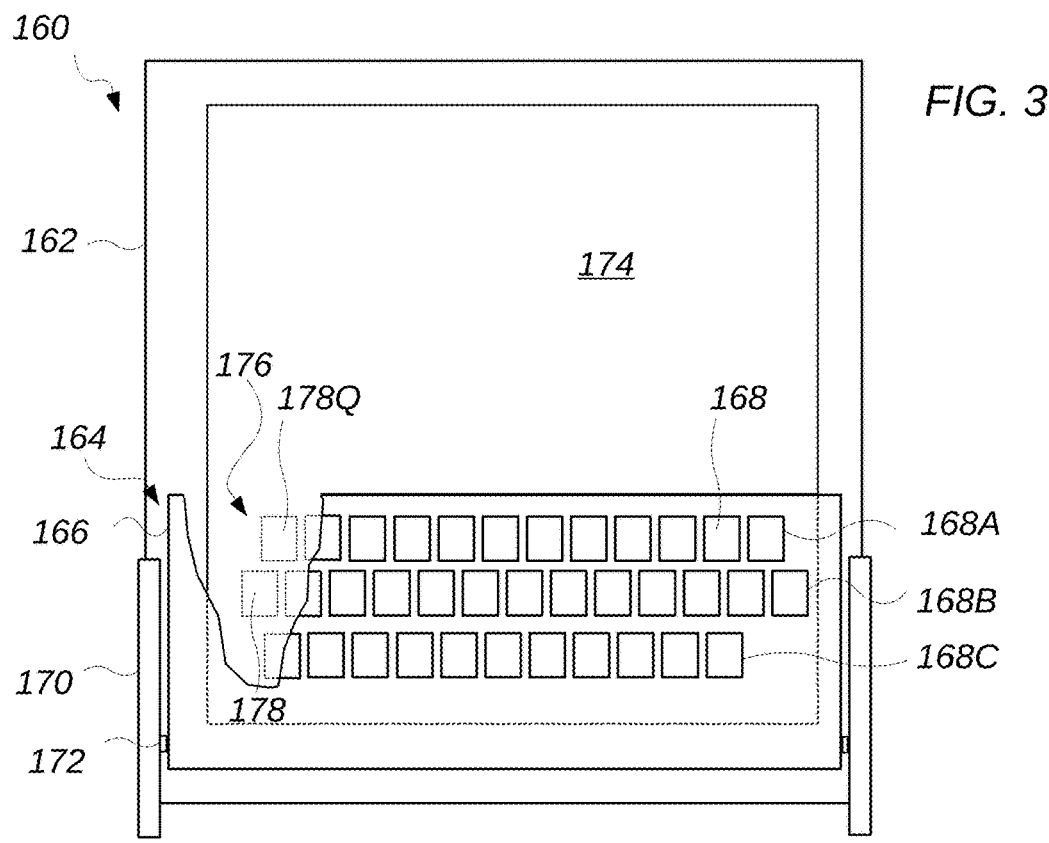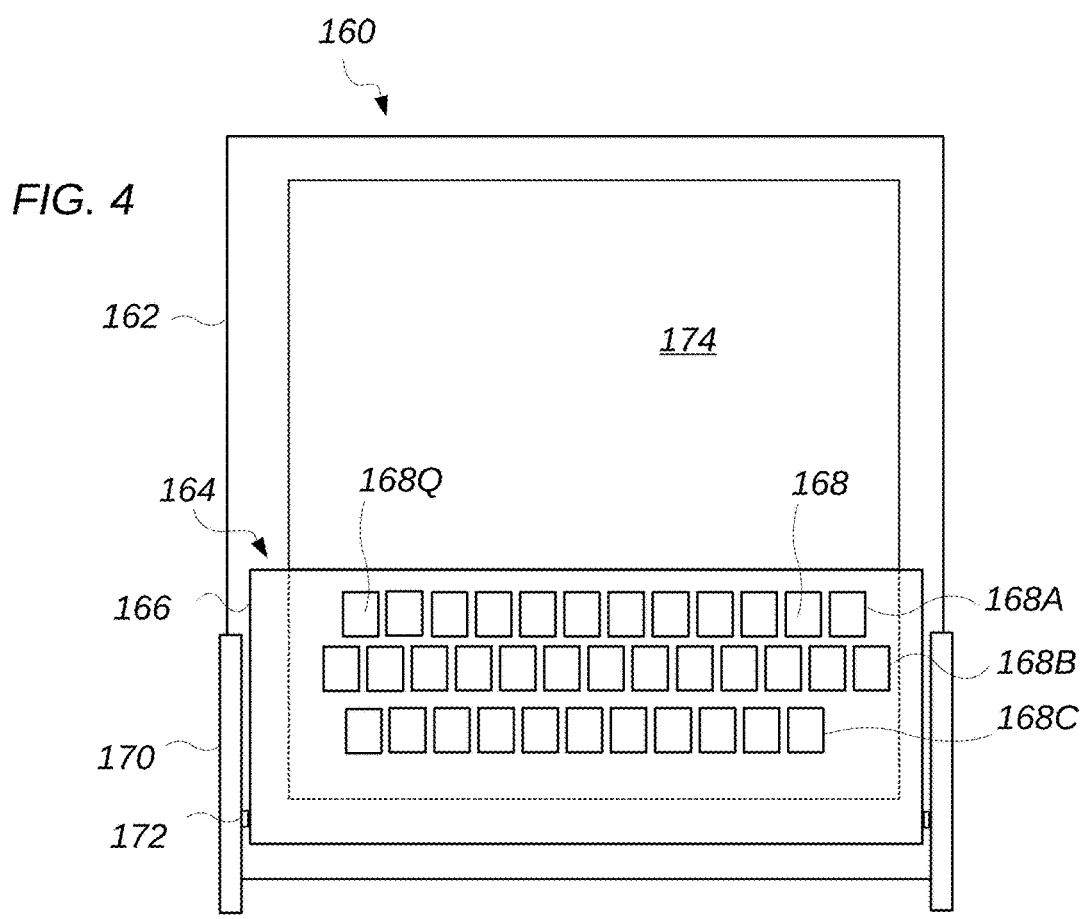

INTEGRATION OF A PHYSICAL KEYBOARD INTO A TERMINAL SYSTEM WITH A VIRTUAL KEYBOARD

PRIORITY CLAIM

This application claims priority to U.S. Application Ser. No. 62/505,990, entitled "Integration of a Physical Keyboard into a Touch Screen Terminal System", filed May 15, 2017, which is incorporated by reference as if fully set forth herein.

BACKGROUND

Description of the Related Art

The touch keyboard (physical and virtual) is still the primary data entry system for all touch panel terminals.

External physical keyboards are inconvenient, bulky, and need cable or wireless access connections and typically a mouse for input. Yet, many users like the feel of a physical keyboard.

Similarly, built-in virtual keyboards in touch panel terminals take up a substantial portion of the available screen space. Virtual keyboards also disappear once any point outside the keyboard is touched, which is quite frustrating at times.

Field

The present invention relates to the field of touch screen terminals, and input devices for using such computing devices, as well as a system reconfiguration. More specifically, embodiments herein relate to physical keyboards used with touch-screen terminal and to a reconfiguration of the terminal system's components.

SUMMARY

Terminal systems including a touch-screen device with a virtual keyboard and a physical keyboard are described. In an embodiment, a terminal system includes a touch panel device capable of receiving input from a user and a physical keyboard including physical keys. The touch panel device includes a display screen for displaying one or more interface elements, and a built-in virtual keyboard including virtual keys configurable to be displayed on the display screen, and at least one processor. The physical keyboard includes physical keys. The physical keyboard is removably coupled to the touch panel device and provides input from the user to the touch panel device when the physical keyboard is coupled to the touch panel device. In one embodiment, the physical keyboard is made of transparent touch-sensitized material and is overlaid to match the device's virtual keyboard keys and area such that the portion below that area is now visible to the user. In another embodiment, the physical keyboard does not overlay (cover) any part of the screen such that the terminal's screen can exhibit images and data onto the entire screen display area including the space previously occupied by the virtual keyboard. The device is also configured to have the virtual keyboard be fixed onto the touch screen until removed with a user command, to receive and display input independently simultaneously from both the screen's main display area and from either keyboard in use, using a single finger, and to have the touch screen be independently moved (scrolled) when the (virtual or physical) keyboards are in use.

BRIEF DESCRIPTION OF THE DRAWINGS

FIG. 3 illustrates one embodiment of a terminal system with a retractable, removable physical keyboard with a cut-away view of the physical keyboard to reveal a portion of a virtual keyboard on a touch screen display.

FIG. 4 illustrates one embodiment of a terminal system with a retractable, removable physical keyboard.

Figure 1:
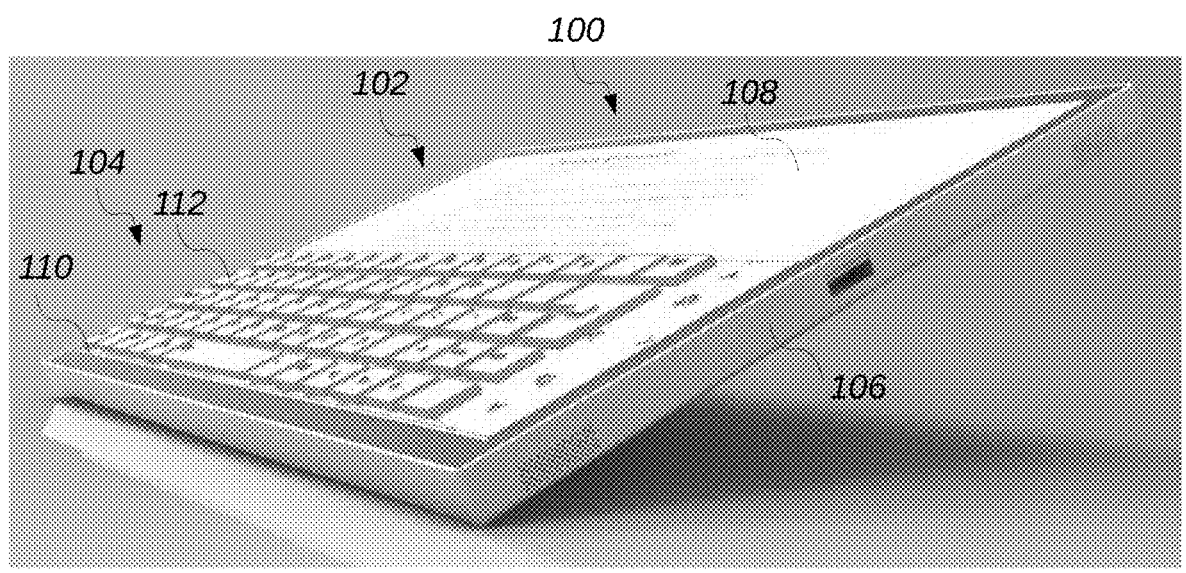
FIG. 1 illustrates one embodiment of a terminal system including a touch-screen device and a physical keyboard.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF ILLUSTRATIVE EMBODIMENTS

In various embodiments, terminal systems including a touch-screen device with a built-in virtual keyboard and a physical keyboard are described.

In one embodiment, a transparent physical keyboard is integrated into the touch panel's input system of a device, as an option to the device's virtual keyboard on which the physical keyboard is overlaid matching the exact keys and area of the virtual keyboard. The physical keyboard is made of a see-through touch sensitized material (silicone rubber or plastic or PVC sheet, etc.) to enhance the user's natural feel touch experience, and is transparent to allow viewing of the screen below it. The physical keyboard is seamlessly overlaid onto the screen and retracted to the back of the terminal; it is also removable. The physical keyboard layout and input coordinates match exactly those of the virtual keyboard. The terminal screen can exhibit images and data onto one or more display areas such as, in particular, onto the substantial display area concealed by the virtual keyboard which is now visible below the transparent physical keyboard.

In another embodiment, the physical keyboard is the same as described above but may be opaque, translucent, or transparent and does not overlay (cover) any part of the screen such that the terminal's screen can exhibit images and data onto the entire screen display area including the space previously occupied by the virtual keyboard. In this embodiment, the physical keyboard is configured to connect to the device via USB, Bluetooth, RF or IR, or other.

In physical screen embodiments, the virtual keyboard may also be enhanced to be fixed onto the touch screen until removed with a user command. The terminal's touch panel can receive input independently from both the screen's main display area and from either keyboard in use, using a single finger. The terminal's screen can also be independently moved (scrolled) when the (virtual or physical) keyboards are in use.

In various embodiments, a physical keyboard couples to a touch panel device such that the at least a portion of the physical keyboard is above the display screen. In this context, "above" a display screen includes the physical keyboard being over the screen such the physical keyboard is between the screen and the eye of the user.

Integration of a Physical Keyboard into a Terminal System with a Virtual Keyboard FIG. 1 illustrates one embodiment of terminal system 100 including touch-screen device 102 and physical keyboard 104. Touch screen device 102 includes housing 106 and touch screen display 108. Touch screen display 108 includes a display area for displaying text, graphics, or other content. Touch screen display 108 includes a virtual keyboard including a set of virtual keys.

Physical keyboard 104 includes base 110 and physical keys 112. Physical keys 112 may be arranged in a manner suitable for use for user input to a computing device using terminal system 100. In one embodiment, physical keys 112 are arranged so as to form a QWERTY keyboard.

Physical keyboard 104 may include clips or other attachment hardware for positioning and holding physical keyboard 104 on touch-screen device 102. Physical keyboard 104 may be removable from touch screen device 102. Removing physical keyboard 104 may expose additional area of touch-screen display 108.

Figure 2:
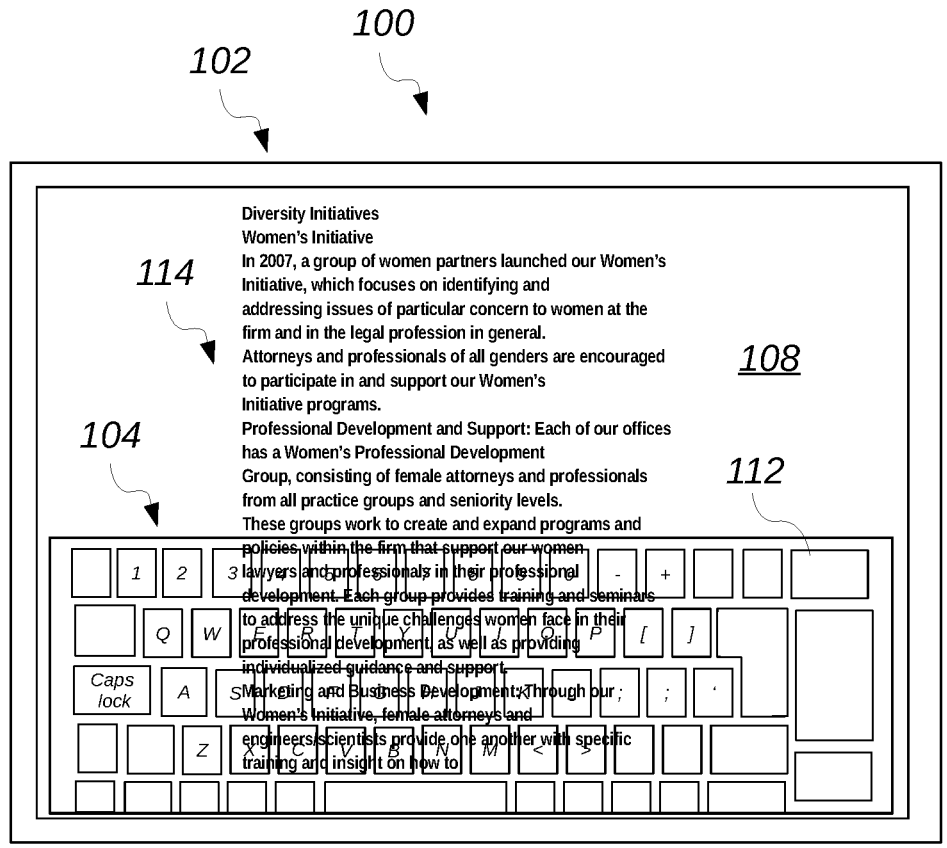
FIG. 2 illustrates an embodiment of a partially transparent physical keyboard that allows viewing of a display screen that is beneath the physical keyboard.

FIG. 2 illustrates an embodiment of a partially transparent physical keyboard that allows viewing of a display screen that is beneath the physical keyboard. Physical keyboard 104 is at least partially transparent, so that content (such as text 114) that is under physical keyboard 104 can still be viewed by the user of terminal system 100. The touch-screen display 108 includes a virtual keyboard. All of the keys of the virtual keyboard are beneath physical keyboard 104.

It is noted that the particular textual material on the keys and display screen in FIGS. 1 and 2 (e.g., "Diversity initiatives", Women's Initiative", etc.") is shown for illustrative purposes only, and the particular content of such textual material is not pertinent to the invention described herein.

In some embodiments, a physical keyboard is integrated into a touch panel's input system of a device, as an option to the device's virtual keyboard.

In some embodiments, the physical keyboard is made of a see-through touch sensitized material (silicone rubber or plastic or PVC sheet, etc.) to enhance the user's natural feel touch experience. Except for the keys identification on its surface, the physical keyboard is fully transparent to allow viewing of the screen below it.

The physical keyboard in the above embodiment is seamlessly overlaid onto the screen. The physical keyboard layout and input coordinates match these of the virtual keyboard. For example, the "a" key of the physical keyboard is above the "invisible" designation of the "a" key of the virtual keyboard, such that when the user presses the "a" key on the physical keyboard the at least one processor will respond exactly as if the "a" key was pressed on the virtual keyboard, and so on.

In another embodiment, the physical keyboard is the same as described above but is not necessarily transparent and does not overlay (cover) any part of the screen such that the terminal's screen can exhibit images and data onto the entire screen display area including the space previously occupied by the virtual keyboard. In this embodiment, the physical keyboard is configured to connect to the device via USB, Bluetooth, RF or IR, or other.

In some embodiments, the virtual keyboard is enhanced to be fixed onto the touch screen until removed with a user command.

The terminal's touch panel can receive input independently from both the screen's main display area and from either keyboard in use. In some embodiments, the terminal's screen can exhibit images and data onto one or more display areas such as, for example, onto the substantial display area concealed by the virtual keyboard, which may now be visible below the transparent physical keyboard, or onto the entire screen display area including the space previously occupied by the virtual keyboard. The freedom to choose multiple inputs and display options may enhance the user experience and the human-machine interaction.

In some embodiments, a physical keyboard is integrated as an option to the built-in virtual keyboard. The built-in virtual keyboard may turn on by default unless the physical keyboard is detected.

The physical keyboard may be seamlessly overlaid and clipped onto the screen. Clips may wrap around the back of the housing of the touch screen device. In certain embodiments, the physical keyboard is held on by way of snap-on connection. In some embodiments, the physical keyboard is held on to the touch screen device by way of a magnetic connection.

In some embodiments, a physical keyboard may be retracted to the back the terminal when the virtual keyboard is used. The physical keyboard may also be removable. FIGS. 3 and 4 illustrates one embodiment of a terminal system with a touch screen device and a retractable, removable physical keyboard. FIG. 3 shows a cut-away over a portion of the physical keyboard to show some of the features relating to a virtual keyboard on the touch-screen device. FIG. 4 illustrates the device shown in FIG. 3, but without any cut-away of the physical keyboard.

Terminal system 160 includes touch screen device 162 and physical keyboard 164. Physical keyboard 164 includes keyboard base 166, physical keys 168, slide rails 170, and hinge pins 172. Physical keys 168 are arranged in rows 168A, 168B, and 168C. Hinge pins 172 may be held in slots on the interior surfaces of slide rails 170. Hinge pins 172 may be slid up and down in the slots of slide rails 170. Slide rails 170 may serve as clips to hold physical keyboard 164 on touch screen device 162.

Touch screen device 162 includes touch-screen 174. Touch-screen 174 includes virtual keyboard 176. Virtual keyboard 176 includes virtual keys 178. Touch-screen 174 may also include display area above virtual keyboard 176.

Physical keyboard 164 may be made of a transparent material, such that the user can see the virtual keys 178 through the transparent structure of physical keyboard 164. In some embodiments, physical keyboard 164 includes a physical key 168 that matches each of the virtual keys 178 on virtual keyboard 176. For example, physical key 168Q may correspondence to virtual key 178Q. Virtual key 178Q may be directly below physical key 168Q when physical keyboard 164 is installed on touch-screen device 162. Physical keyboard 164 may be made of a resilient material (e.g., an elastomer). Physical key 168Q may be pressed by a user to activate virtual key 178Q. Other virtual keys on virtual keyboard 176 may have a corresponding physical key on physical keyboard 164.

Figure 5:
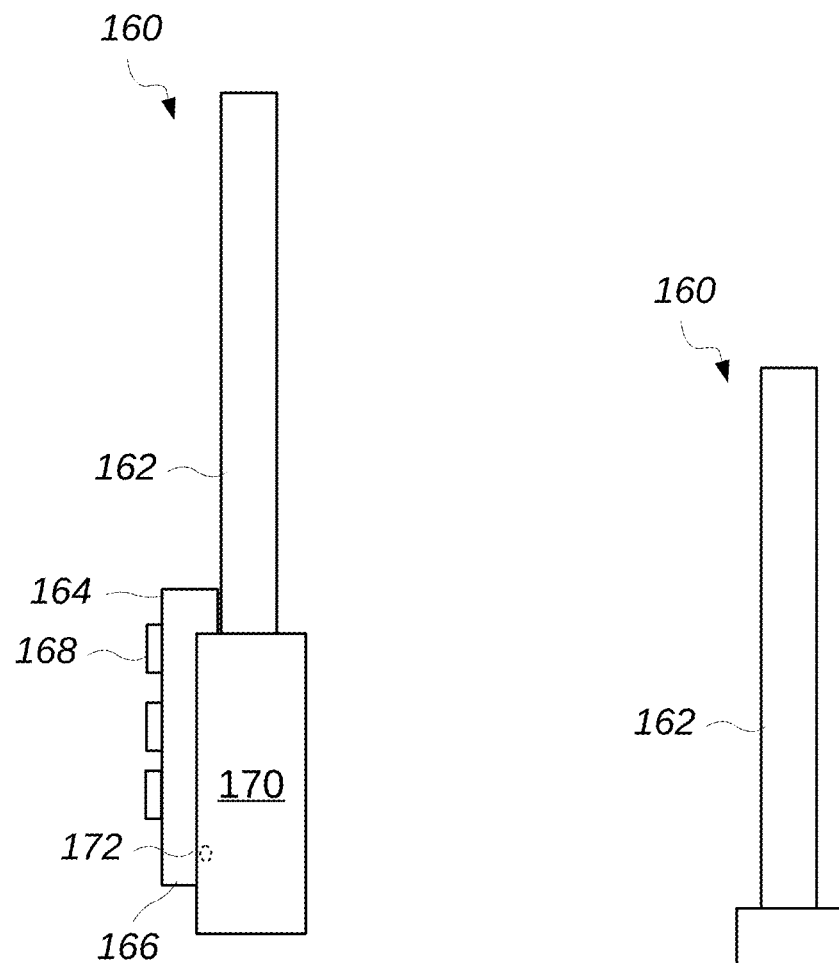
FIG. 5 illustrates a side view of the embodiment of a terminal system including touch-screen device with a physical keyboard attached.
Figure 6:
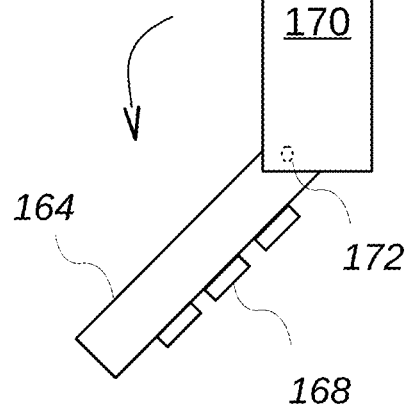
FIG. 6 illustrates the physical keyboard swung away from a display device during retraction of the physical keyboard.

FIG. 5 illustrates a side view of the embodiment of a terminal system shown in FIGS. 3 and 4. FIG. 6 illustrates the physical keyboard swung away from the display device during retraction of the physical keyboard to an out-of-the-way storage position on the rear surface of touch screen device 162. Keyboard base 166 may be swung away from the display screen 180 of touch display device 162 on hinge pins 172.

In some embodiments, physical keyboard 164 is slid to the lower end of its travel on slide rails 170, then swung on hinge pins 172 under the housing of touch screen device 162 to an out-of-the way resting position on the rear surface of touch screen device 162.

Although, in some of the embodiments described above, the physical keyboard is attached to the touch screen device using integral clips, other forms of attachment may be used in various embodiments. In addition, clips or other mounting hardware may be separate component from the physical keyboard (rather than, for example, integrated into the physical keyboard).

Although, in various embodiments described above, a physical keyboard has been described as being at least partially transparent, a physical keyboard and/or each of its keys may be opaque. In addition to the physical keys, a physical keyboard may include touch sensors, power components, printed circuit boards, wireless adapters, batteries, and various other components for housing or supporting the keys and/or enabling connectivity with a touch screen device.

In some embodiments, a physical keyboard may be made of a transparent touch sensitized material (silicone rubber or plastic or PVC sheet, etc.) to enhance the user's natural feel touch experience and to allow viewing of the screen data below the keyboard area.

Physical keyboard 164 may automatically connect to the controller of touch screen panel device 162. Connection may be accomplished by wired or wireless connection, by way of a USB, blue-tooth RF or IR connection.

Figure 7:
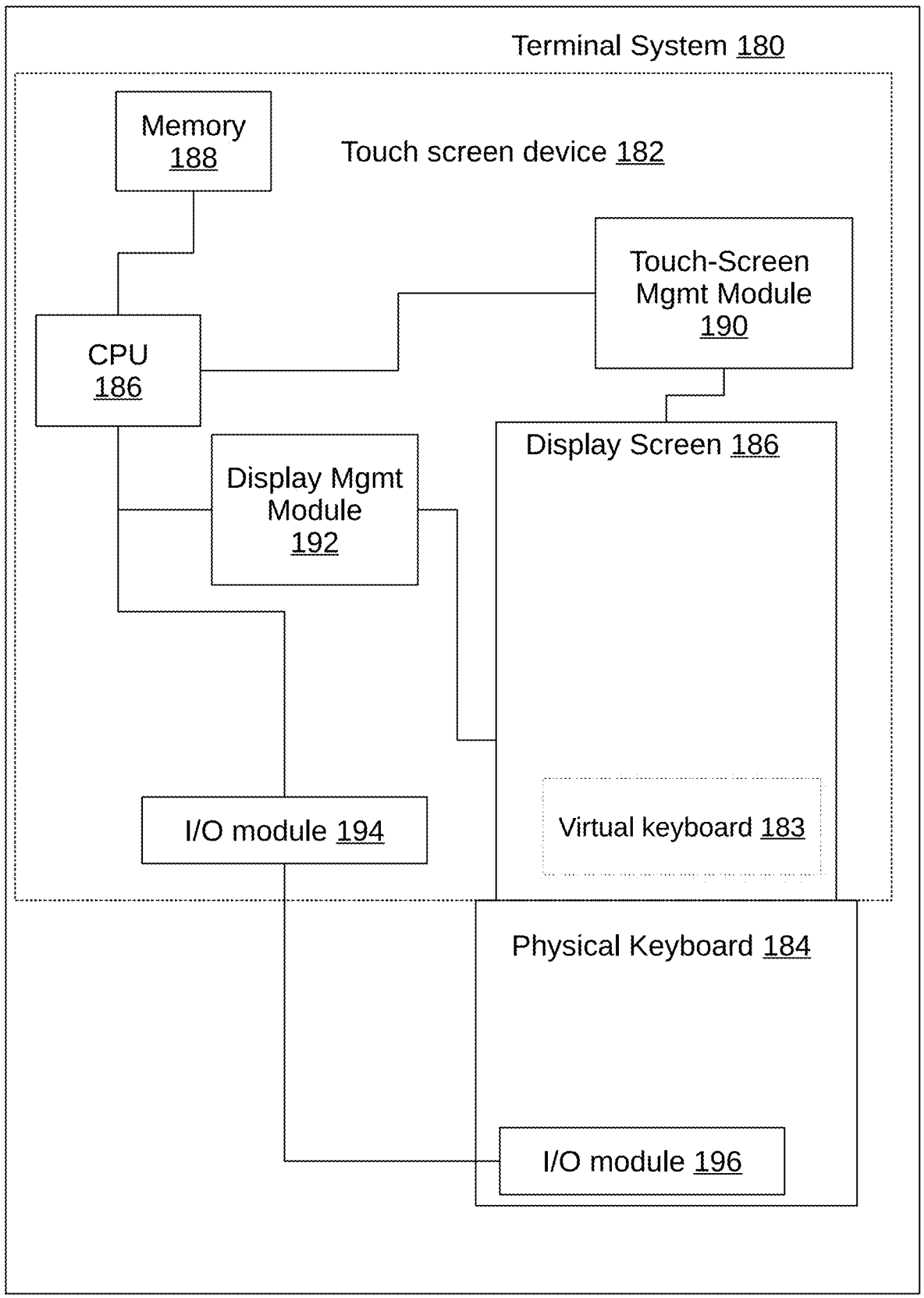
FIG. 7 is a schematic diagram illustrating one embodiment of terminal system having touch-screen device and a physical keyboard.

FIG. 7 is a schematic diagram illustrating one embodiment of terminal system having touch-screen device with a built-in virtual keyboard and a physical keyboard. Terminal system 180 includes touch-screen device 182 with virtual keyboard 183 and physical keyboard 184. Touch screen device 182 includes display screen 184, CPU 186, memory 188, touch-screen management module 190, display management module 192, and keyboard 110 module 194. Physical keyboard 184 include may include physical keys and touch-screen device I/O module 196.

In various embodiments, the physical keyboard layout and input coordinates match exactly those of the virtual keyboard. The physical keyboard may be programmed to communicate with the controller and the software driver exactly as the virtual keyboard would, irrespective of the touch screen technology used (resistive, capacitive, SAW, IR, etc.).

The virtual keyboard may be enhanced such that it is fixed onto the touch panel screen until removed with a user command, and will no longer disappear once any point outside the keyboard is touched.

The terminal's touch panel may be enhanced so as to receive input independently from the screen's main display area and from either one of the keyboards in use.

The terminal's screen may also be enhanced to exhibit images and data onto one or more display areas and in particular, onto the substantial display area concealed by the virtual keyboard but now visible below the transparent physical keyboard.

Although, in some of the embodiments described above, a physical keyboard is coupled to a touch-screen device such that the physical keyboard is over a touch-screen display, an attached physical keyboard may be mounted such that the physical keyboard sits below the touch-screen display. In some embodiments, the bottom edge of the physical keyboard extends downwardly beyond the lower edge of the touch-screen device.

Figure 8:
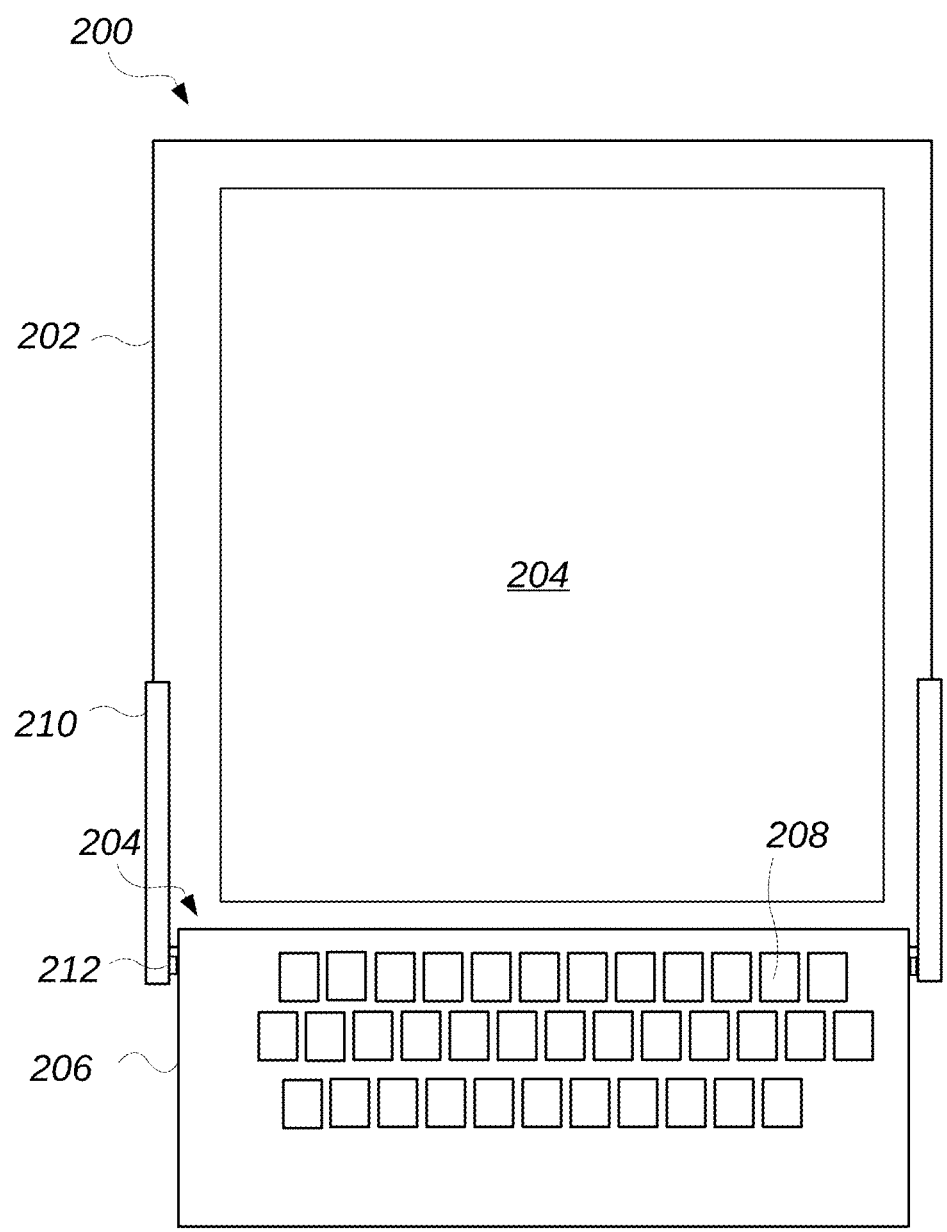
FIG. 8 illustrates one embodiment of a terminal system having a physical keyboard mounted to a touch-screen device such that the physical keyboard is not above the touch screen display.

FIG. 8 illustrates one embodiment of a terminal system having a physical keyboard mounted to a touch-screen device such that the physical keyboard is not above the touch screen display. Terminal system 200 includes touch-screen device 202 and physical keyboard 204. Touch screen device 202 includes touch-screen display 206. Physical keyboard 204 includes keyboard base 208 and physical keys 210. Physical keyboard 204 may be mounted on touch-screen device 202 by way of slide rails 212 and hinge pins 214. The touch-screen device 202 may include a virtual keyboard on touch-screen display 206. The virtual keyboard may be activated and deactivated in a manner such as described above relative to FIGS. 1-7.

As used herein, "terminal" includes any device that can receive input to a computing device from a user, and display information to the user from the computing device.

As used herein, a "terminal system" includes any device that includes one or more terminals. In some embodiments, a terminal system includes some or all of the components of the computing device physically integrated with (e.g., in the same housing as) input and display components. For example, the central processing unit of a hand-held computing device may be packaged with a touch-screen device.

As used herein, "touch-screen terminal system" includes any terminal system that receives input by way of a touch-screen.

As used herein, "physical keyboard" includes any device having physical keys to be pressed by a user that can be used to provide input to a computing device. A physical keyboard may include a base, pad, plate, or other structure on which individual keys are mounted. In some embodiments, a keyboard has electronic components for receiving input from the user's touching or depression of individual keys and transmitting signals to a computing device corresponding to the user's actions. In certain embodiments, a keyboard may be slab or block of material, portions of which are formed as individual keys (e.g., a molded rubber sheet with keys molded or otherwise formed on the upper surface of the sheet). In certain embodiments, a physical keyboard provides its input to a computing device as a physical intermediary between a user's finger and a touch screen.

As used herein, a "physical key" includes any key that is a physical object, or a portion, segment, or region of a physical object. A "physical key" does not include a key that only exists as a display element generated on a touch screen, such as a key displayed on a virtual keyboard.

As used herein, a "virtual key" is a key that appears as a discernable region of a display or screen (e.g., the touch display of a touch panel).

A terminal system may include, or be included as part of, a computer system or computing device. Computer systems and computing devices may, in various embodiments, include components such as a CPU with an associated memory medium such as a solid-state storage device or Compact Disc Read-Only Memory (CD-ROM). The memory medium may store program instructions for computer programs. The program instructions may be executable by the CPU. Computer systems may further include a display device such as monitor, an alphanumeric input device such as keyboard, and a directional input device such as mouse. Computer systems may be operable to execute the computer programs to implement computer-implemented systems and methods. A computer system may allow access to users by way of any browser or operating system.

Computer systems and computing devices may include a memory medium on which computer programs according to various embodiments may be stored. The term "memory medium" is intended to include an installation medium, e.g., Compact Disc Read Only Memories (CD-ROMs), a computer system memory such as Dynamic Random Access Memory (DRAM), Static Random Access Memory (SRAM), Extended Data Out Random Access Memory (EDO RAM), Double Data Rate Random Access Memory (DDR RAM), Rambus Random Access Memory (RAM), etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. A computer system may take various forms such as a personal computer system, mainframe computer system, workstation, network appliance, Internet appliance, television system or other device. In general, the term "computer system" may refer to any device having a at least one processor that executes instructions from a memory medium.

The memory medium may store a software program or programs operable to implement embodiments as described herein. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. A CPU executing code and data from the memory medium may include a means for creating and executing the software program or programs according to the embodiments described herein.

A computing system may include, and/or may be implemented as, multiple functional modules or components, with each module or component including one or more resources (e.g., computing resources, storage resources, database resources, etc.). A system may include more or fewer components or modules, and a given module or component may be subdivided into two or more sub-modules or sub-components. Also, two or more of the modules or components can be combined.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims.

What is claimed is:

1. A terminal system, comprising:
    a touch panel device capable of receiving input from a user, the touch panel device comprising:
        a display screen for displaying one or more interface elements; and
        a built-in virtual keyboard comprising virtual keys configurable to be displayed on the display screen;
        one or more processors; and
        a memory comprising program instructions; and
    a physical keyboard comprising physical keys, wherein the physical keyboard is configured to couple to the touch panel device such that the at least a portion of the physical keyboard is above the display screen,
    wherein the physical keyboard is configurable to provide input from the user to the touch panel device when the physical keyboard is coupled to the touch panel device,
    wherein the physical keyboard is at least partially transparent to allow viewing of at least a portion of the display screen below the keyboard area of the physical keyboard,
    wherein the physical keyboard has a layout and input coordinates that match those of the built-in virtual keyboard,
    wherein the touch screen panel is configurable to receive input from the user by way of both the physical keyboard and the virtual keyboard,
    wherein the physical keyboard is made of a resilient touch sensitized material that allows one or more of the virtual keys to be actuated by a user by the user depressing a corresponding physical key of the physical keyboard; and
    wherein the program instructions are executable by at least one of the one or more processors to implement:
        fixing the virtual keyboard onto the display screen of the touch panel device such that the virtual keyboard can only be removed with a user command;
        removing, in response receiving a command from the user, at least a portion of the virtual keyboard from the display screen of the touch panel device while the physical keyboard remains coupled to the touchpad device; and
        displaying scrollable images or scrollable text on at least a portion of the display screen beneath a transparent portion of the physical keyboard such that the user can view images or data through the transparent portion of the physical keyboard.

2. The terminal system of claim 1, wherein the physical keyboard is configured to removably couple to the touch panel device such that no part of the physical keyboard is above the display screen.

3. The terminal system of claim 2, wherein the physical keyboard is clipped onto the touch screen device.

4. The terminal system of claim 2, wherein the physical keyboard has electrical contacts to electrically connect to the touch panel device.

5. The terminal system of claim 2, wherein the physical keyboard is configured to wirelessly connect to the touch panel device.

6. The terminal system of claim 1, wherein the physical is retractable to the back of the terminal.

7. The terminal system of claim 1, further comprising a memory comprising program instructions, wherein the program instructions are executable by at least one of the one or more processors to implement a touch screen management module.

8. The terminal system of claim 7, wherein the touch screen management module is configured to turn on the built-in virtual keyboard as the default keyboard when the physical keyboard is not connected.

9. The terminal system of claim 7, wherein the touch screen management module is configured to recognize when the physical keyboard is connected and select it as the primary keyboard.

10. The terminal system of claim 7, wherein the touch screen management module is configured to receive input independently and simultaneously from the screen's main display area and from either one of the keyboards in use.

11. The terminal system of claim 1, wherein the scrollable images or scrollable text comprises scrollable text, wherein the scrollable text starts on a portion of the display screen that is not beneath the physical keyboard and continues onto a portion of the display screen that is beneath a transparent portion of the physical keyboard such that the user can read both the text that is not beneath the physical keyboard and the text that is beneath the physical keyboard.

12. A terminal system, comprising:
a touch panel device capable of receiving input from a user, the touch panel device comprising:
a display screen for displaying one or more interface elements; and
a built-in virtual keyboard comprising virtual keys configurable to be displayed on the display screen;
one or more processors; and
a memory comprising program instructions;
a physical keyboard comprising two or more physical keys,
wherein the physical keyboard is configured to removably couple to the touch panel device,
wherein the physical keyboard is at least partially transparent to allow viewing of at least a portion of the display screen of the touch panel device below the keyboard area of the physical keyboard,
wherein the physical keyboard is configurable to provide input from the user to the touch panel device when the physical keyboard is coupled to the touch panel device,
wherein the physical keyboard has a layout and input coordinates that match those of the built-in virtual keyboard, and
wherein the program instructions are executable by at least one of the one or more processors to implement:
fixing the virtual keyboard onto the display screen of the touch panel device such that the virtual keyboard can only be removed with a user command;
removing, in response receiving a command from the user, at least a portion of the virtual keyboard from the display screen of the touch panel device while the physical keyboard remains coupled to the touchpad device; and
displaying scrollable images or scrollable text on at least a portion of the display screen beneath a transparent portion of the physical keyboard such that the user can view images or data through the transparent portion of the physical keyboard.

13. The terminal system of claim 12, wherein the physical keyboard comprises one or more clips configured to mount the physical keyboard on the touch panel device.

14. The terminal system of claim 12, wherein the physical keyboard is slideable relative to the display screen of the touch panel device to a position in which the physical keyboard is below the bottom edge of the display screen of the touch panel device such that the physical keyboard does not cover any portion of the display screen and the physical keyboard while the physical keyboard remains coupled to the touch panel device and the physical keyboard is configured to provide user input to the touch panel device.

15. The terminal system of claim 12, wherein the physical keyboard is configured to swing away from the display screen of the touch panel device.

16. A method of using a terminal system, comprising:
coupling a physical keyboard to a touch panel device having a built-in virtual keyboard;
operating the physical keyboard to provide input from the user to the touch panel device while the physical keyboard is coupled to the touch panel device;
fixing the virtual keyboard onto the display screen of the touch panel device such that the virtual keyboard can only be removed with a user command;
removing, in response receiving a command from the user, at least a portion of the virtual keyboard from the display screen of the touch panel device while the physical keyboard remains coupled to the touchpad device; and
displaying scrollable images or scrollable text on at least a portion of the display screen beneath a transparent portion of the physical keyboard such that the user can view images or data through the transparent portion of the physical keyboard.

17. The method of claim 16, wherein the physical keyboard has a layout and input coordinates that match those of the built-in virtual keyboard, wherein the physical keyboard is made of a resilient touch sensitized material that allows one or more of the virtual keys to be actuated by a user by the user depressing a corresponding physical key of the physical keyboard.

18. The method of claim 16, further comprising retracting the physical keyboard such that the physical keyboard is out of the way of the display screen of the touch-panel device.

19. The method of claim 16, further comprising receiving input from a user's touch of a portion of the touch panel display screen that is not beneath the physical keyboard while the physical keyboard is installed on the touch screen device.

20. The method of claim 16, further comprising receiving input from a virtual key beneath the physical keyboard while the physical keyboard is installed on the touch screen device.

21. The method of claim 16, further comprising actuating keys of a virtual keyboard below by pressing physical keys on the physical keyboard.

22. A terminal system, comprising:
a touch panel device capable of receiving input from a user, the touch panel device comprising:
  a display screen for displaying one or more interface elements; and
  a built-in virtual keyboard comprising virtual keys configurable to be displayed on the display screen;
  one or more processors; and
  a memory comprising program instructions; and
a physical keyboard comprising physical keys, wherein the physical keyboard is configured to couple to the touch panel device,
wherein the physical keyboard is configurable to provide input from the user to the touch panel device when the physical keyboard is coupled to the touch panel device; and
wherein the program instructions are executable by at least one of the one or more processors to implement:
  fixing the virtual keyboard onto the display screen of the touch panel device such that the virtual keyboard can only be removed with a user command;
  removing, in response receiving a command from the user, at least a portion of the virtual keyboard from the display screen of the touch panel device while the physical keyboard remains coupled to the touchpad device; and
  displaying scrollable images or scrollable text on at least a portion of the display screen beneath a transparent portion of the physical keyboard such that the user can view images or data through the transparent portion of the physical keyboard.

23. The terminal system of claim 22, wherein the physical keyboard is configurable to be positioned on the touch panel device lower than the display screen of the touch panel device, such that the user can operate any portion of the touch-screen device and the physical keyboard at the same time.

24. The terminal system of claim 22, wherein the touch screen panel is configurable to receive input from the user by way of both the physical keyboard and the virtual keyboard.

25. The terminal system of claim 22, wherein the physical keyboard is made of a resilient touch sensitized material that allows one or more of the virtual keys to be actuated by a user by the user depressing a corresponding physical key of the physical keyboard.

* * * * *